(12) United States Patent
Yang et al.

(10) Patent No.: US 10,034,196 B2
(45) Date of Patent: Jul. 24, 2018

(54) METHODS, SYSTEMS AND DEVICES FOR IMPROVING DISCONTINUOUS RECEPTION IN WIDEBAND WIRELESS NETWORKS

(71) Applicant: Alcatel-Lucent USA, Inc., Murray Hill, NJ (US)

(72) Inventors: Yang Yang, Morris Plains, NJ (US); Ming Lu, Hillsborough, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 427 days.

(21) Appl. No.: 14/042,533

(22) Filed: Sep. 30, 2013

(65) Prior Publication Data
US 2015/0092541 A1    Apr. 2, 2015

(51) Int. Cl.
*H04J 1/16* (2006.01)
*H04W 28/02* (2009.01)
(Continued)

(52) U.S. Cl.
CPC ... *H04W 28/0278* (2013.01); *H04W 72/1284* (2013.01); *H04W 76/28* (2018.02);
(Continued)

(58) Field of Classification Search
CPC ......... H04W 28/0278; H04W 72/1284; H04W 76/048; H04W 76/28; Y02D 70/00; Y02D 70/1262; Y02D 70/24
(Continued)

(56) References Cited

U.S. PATENT DOCUMENTS

| 2010/0034147 A1 | 2/2010 | Ho et al. |
| 2010/0135229 A1* | 6/2010 | Lohr ................ H04W 72/1284 370/329 |

(Continued)

FOREIGN PATENT DOCUMENTS

EP    2293637    3/2011

OTHER PUBLICATIONS

Philips et al., "Improving the Robustness of Buffer Status Reporting", 3GPP TSG RAN WG2 Meeting #63, Jeju, Korea, vol. R2-084090, No. 63, Aug. 18, 2008, p. 1-4.

*Primary Examiner* — Kan Yuen
(74) *Attorney, Agent, or Firm* — The Capitol Patent & Trademark Law Firm, PLLC

(57) ABSTRACT

Methods, systems and devices for improving discontinuous reception (DRX) in wireless telecommunication networks are disclosed. According to an embodiment, a retransmission buffer status report (BSR) timer is implemented in a user equipment (UE) as an attribute that is configurable for each logical channel of the UE. According to another embodiment, a data flush token is implemented as a logical channel attribute in a UE in order to expedite emptying of the UE's uplink buffer. According to another embodiment, improvements are provided to the manner in which a UE determines to cancel regular BSRs. According to other embodiments, features are implemented at a base station such as an E-UTRAN Node B (eNB) to improve downlink and uplink transmission scheduling between the base station and a UE. According to further embodiments, improved methods of detecting and handling late and delayed BSRs are implemented at a base station. The disclosed embodiments promote improved battery life of a UE as well as improved network data performance.

13 Claims, 8 Drawing Sheets

700

| Logical Channel Config field descriptions |
|---|
| priority<br>Logical channel priority in TS 36.321. Value is an integer. |
| prioritized bit rate<br>Prioritized bit rate for logical channel prioritization in TS 36.321. Value in kilobytes per second. |
| bucket size duration<br>Bucket size duration for logical channel prioritization. Value in milliseconds. |
| logical channel group<br>Mapping of logical channel to logical channel group for BSR reporting. |
| BSR retransmission timer<br>Timer establishing duration of time prior to retransmission of BSR in the absence of receipt of an uplink grant. BSR is sent when timer expires and UE has data in the uplink buffer. Timer is started when a BSR is sent and stopped when an uplink grant is received. Value in milliseconds. |
| data flush token<br>Maximum number of allowed requests for triggering an "irregular", regular BSR when the UE has data in its uplink buffer for transmission and there is no pending regular BSR. Value is an integer. |

(51) Int. Cl.
 *H04W 72/12* (2009.01)
 *H04W 76/28* (2018.01)
(52) U.S. Cl.
 CPC .......... *Y02D 70/00* (2018.01); *Y02D 70/1262* (2018.01); *Y02D 70/24* (2018.01)
(58) Field of Classification Search
 USPC ........................................................ 370/230
 See application file for complete search history.

(56) References Cited

U.S. PATENT DOCUMENTS

| | | | |
|---|---|---|---|
| 2010/0232387 A1* | 9/2010 | Marchand | H04W 72/1284 370/329 |
| 2010/0322086 A1 | 12/2010 | Harris et al. | |
| 2012/0039204 A1* | 2/2012 | Gao | H04W 72/0486 370/252 |

* cited by examiner

700

| Logical Channel Config field descriptions |
|---|
| *priority* <br> Logical channel priority in TS 36.321. Value is an integer. |
| *prioritized bit rate* <br> Prioritized bit rate for logical channel prioritization in TS 36.321. Value in kilobytes per second. |
| bucket size duration <br> Bucket size duration for logical channel prioritization. Value in milliseconds. |
| logical channel group <br> Mapping of logical channel to logical channel group for BSR reporting. |
| BSR retransmission timer <br> Timer establishing duration of time prior to retransmission of BSR in the absence of receipt of an uplink grant. BSR is sent when timer expires and UE has data in the uplink buffer. Timer is started when a BSR is sent and stopped when an uplink grant is received. Value in milliseconds. |
| data flush token <br> Maximum number of allowed requests for triggering an "irregular", regular BSR when the UE has data in its uplink buffer for transmission and there is no pending regular BSR. Value is an integer. |

*FIG. 5*

METHODS, SYSTEMS AND DEVICES FOR IMPROVING DISCONTINUOUS RECEPTION IN WIDEBAND WIRELESS NETWORKS

As smartphones and other smart devices such as tablet PCs and laptop PCs (often referred to as user equipment) that communicate over wireless telecommunications networks are becoming increasingly popular and used for talking with others, surfing the Internet, sending and receiving text messages, sending and receiving e-mail messages, playing music and video content, playing games and so on, it is of increasing concern to provide such smart devices with increased battery life performance. One known method for prolonging the battery life of user equipment (UEs) in Long-Term Evolution (LTE) networks and other wireless networks is discontinuous reception (DRX). In DRX, baseband radio frequency (RF) transmission/reception (TX/RX) circuits are shut down in the absence of data traffic between the UE and a base station or enhanced Node B (eNB). An example of a conventional DRX technique is discussed below with respect to FIG. 1.

FIG. 1 illustrates how DRX may be employed to reduce battery power consumption in a user equipment (UE) according to a conventional method per 3GPP TS 36.321, which specifies the standard for DRX control and management on the side of a UE in an LTE network. In FIG. 1, a DRX cycle 10 starts with a short "DRX ON" period 10a and is followed by a "DRX opportunity" period 10b. During the DRX ON period 10a, the UE is in a "DRX ON" (active) state in which it attempts to detect downlink signals on the physical downlink control channel (PDCCH) for downlink assignments and uplink grants. During the DRX opportunity period 10b, the UE is allowed to go into a sleep mode in which the baseband and RF TX/RX circuits of the UE are turned off and the UE does not have to monitor downlink signals or transmit uplink signals, because there is no data for transmission in either the downlink or uplink directions between the UE and the eNB. It is usually a major source of power consumption for the UE to receive downlink signals and transmit uplink signals. Therefore, entering a "DRX OFF" (inactive) state during the DRX Opportunity period may significantly reduce power consumption by the UE, and thereby prolong its battery life.

SUMMARY

A major drawback of the DRX solution specified in 3GPP TS 36.321 is that a UE and eNB may not be able to keep pace with each other when the UE is entering the DRX OFF state due to various transmission errors. This type of DRX mismatch will lead to data performance degradation and unnecessary waste of battery power.

For example, a DRX opportunity period 10b (FIG. 1) may be determined primarily based on information contained in buffer status reports (BSRs) sent from a UE to an eNB. Depending on its type, the BSR may inform the eNB of the amount of data in the UE's uplink buffer for either one specific logical channel group (LCG), or all LCGs in the radio link control layer (RLC) of the UE. If a UE has a single chunk of data to send, the following BSR-related problems may result in a DRX mismatch between the UE and an eNB in the existing 3GPP TS 36.321 solution:

1) the BSR from the UE to the eNB is lost due to transmission errors;
2) the BSR from the UE to the eNB is received too late due to a long process of multiple hybrid automatic repeat request (HARQ) retransmissions; and
3) a scheduling delay on the side of the eNB exceeds the duration of the DRX ON period 10a (FIG. 1) so that the UE cannot be scheduled to transmit data signals until the next DRX ON period.

Due to the situations described above, it is difficult to optimize the trade-off between reduced UE power consumption and data service performance within the current framework of DRX management. Accordingly, it is desirable to provide enhancements to DRX management to improve battery life performance of UEs and improve network data service performance.

The disclosure relates to enhancements to discontinuous reception (DRX) management in wireless telecommunication networks. The disclosed methods and devices reduce power consumption of user equipment (UE) and improve data service performance in wireless telecommunications networks.

According to an embodiment, a method for expediting emptying of an uplink buffer of a user device in a telecommunication network is provided. According to the method, a data flush token may be inserted as an attribute of a logical channel in a communication protocol stack of the user device and an integer value of the data flush token may be set to an initial value. An irregular, regular buffer status report may be triggered upon determining that the user device has data in its uplink buffer for transmission, there is no pending regular buffer status report previously generated by the user device, and the integer value of the data flush token is greater than 0. The integer value of the data flush token may decremented by 1 upon triggering of the irregular, regular buffer status report.

According to another embodiment, a method of operating a user device in a telecommunication network includes: triggering a regular buffer status report indicating an amount of data available for transmission in an uplink buffer of the user device; and canceling the regular buffer status report only upon determining that the user device receives a positive acknowledgement on a downlink to an uplink transmission carrying the regular buffer status report.

According to additional embodiments, novel user devices and base stations are provided. The user devices and base stations and include one or more processors operable to execute instructions stored in memory in order to carry out the above methods, and/or, in addition complete one or more of the following: generate an independently configurable retransmission buffer status report timer for each logical channel in a communication protocol stack of the user device; configuring the retransmission buffer status report timer to set a time delay for retransmission of a buffer status report by the user device, wherein the buffer status report indicates an amount of data available for transmission in an uplink buffer of the user device.

Additional features and advantages of the described embodiments will be apparent to those skilled in the art from the following detailed description, claims and appended drawings.

BRIEF DESCRIPTION OF THE DRAWINGS

FIG. 5 is a table showing logical channel configuration fields for the user device of FIG. 2, according to an embodiment of the invention.

DETAILED DESCRIPTION, WITH EXAMPLES

The following description discloses exemplary embodiments that provide enhancements to discontinuous reception (DRX) management in wireless telecommunication networks. The methods and devices disclosed herein reduce power consumption of user equipment (UE) and improve data service performance in wireless telecommunications networks. The embodiments disclosed herein are described with respect to known DRX management standards, particularly the standard specified in 3GPP TS36.321 for 4G Long-Term Evolution (LTE) wireless networks, and provide improvements and/or modifications to known DRX standards. However, it should be understood that the methods and devices disclosed herein may be applied to other types of wireless networks other than LTE networks, and standards other than 3GPP TS36.321.

Figure 1:
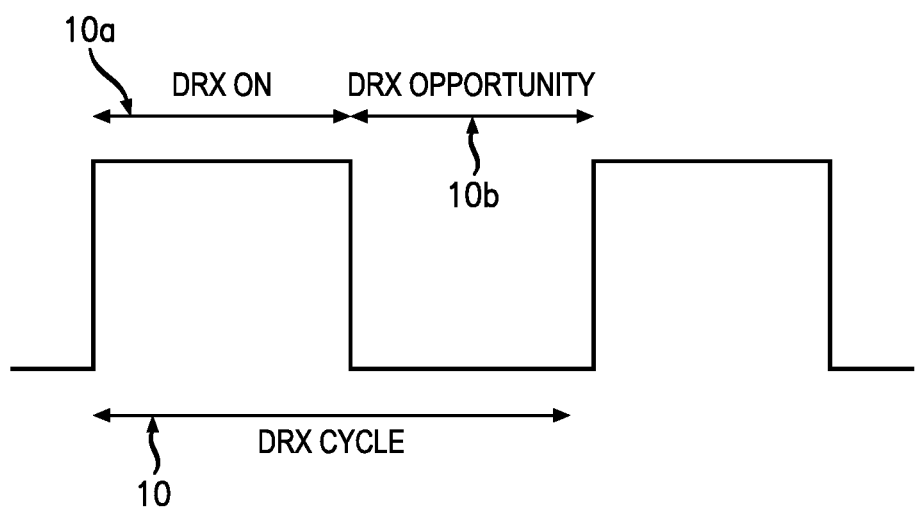
FIG. 1 illustrates a discontinuous reception (DRX) cycle implemented in an Long-Term Evolution (LTE) network according to a conventional method in accordance with the 3GPP TS 36.321 standard.
Figure 2:
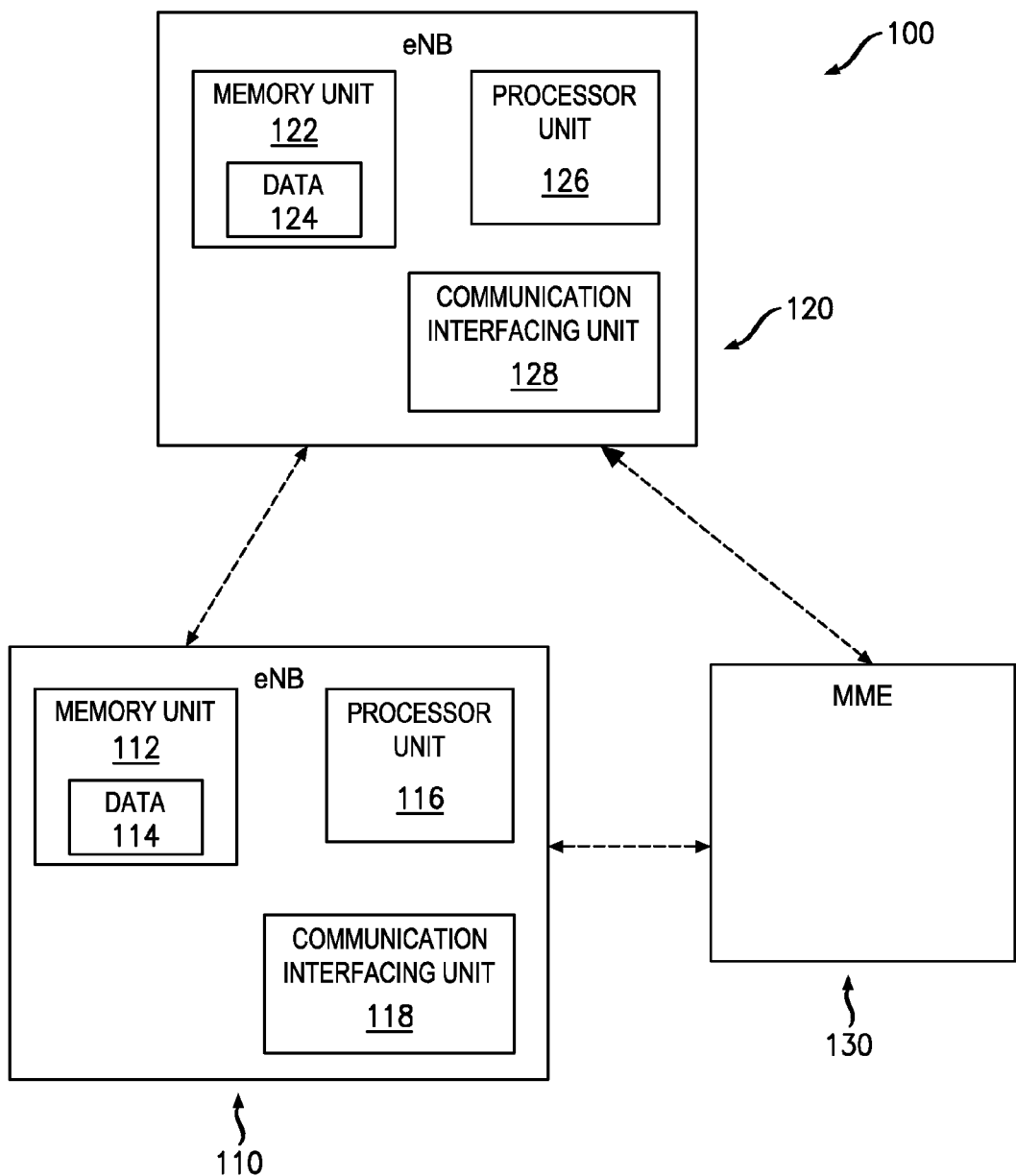
FIG. 2 shows a wireless telecommunication network including a user equipment (UE) connected to a base station (eNB), according to an exemplary embodiment of the invention.

FIG. 2 illustrates a wireless telecommunication network 100 (e.g., Long-Term Evolution (LTE) wireless network) including a user device, or user equipment (UE), 110 wirelessly connected to a base station or evolved Node B (eNB) 120. The network 100 further includes a mobility management entity (MME) 130 that is responsible for initiating paging and authentication of the UE 110, keeping location information about the UE 110 and selecting a gateway during initial registration of the UE 110 in the network 100.

The UE 110 may be a mobile device such as a smartphone or tablet PC, or any other device configured for voice and/or data communication. As shown in FIG. 2, the UE 110 includes hardware including a memory unit 112, a processor or processor unit 116, and a communication interfacing unit 118. The memory unit 112 may include one or more data storage devices that store storage data 114, including program code, which is read and processed by one or more processing devices of the processor unit 116. Devices that may be included in the memory unit 112 include a subscriber identity module (SIM), read-only memory (ROM), random-access memory (RAM), CD-ROMs, magnetic tapes, hard disks, and optical data storage devices, for example. The memory unit 112 may further include one or more buffers for temporary storage of data and carrier waves, for example.

The processor unit 116 may be operable to execute instructions stored in the memory unit 112 or elsewhere to carry out processes implemented at the UE 110, as described in various following embodiments.

The communication interfacing unit 118 is preferably a radio transceiver for wirelessly communicating with other communication devices. The communication interfacing unit 118 may be operable to transform output from the processor unit 116 into radio signals for transmission to the eNB 120 and other devices in the network 100, and may be operable to receive radio signals from the eNB 120 and other communication devices in the network 100.

The eNB 120 includes hardware including a memory unit 122, a processor or processor unit 126, and a communication interfacing unit 128. The memory unit 122 may include one or more data storage devices that store storage data 124, including program code, which is read and processed by one or more processing devices of the processor unit 126. Examples of devices that may be included in the memory unit 122 include a subscriber identity module (SIM), read-only memory (ROM), random-access memory (RAM), CD-ROMs, magnetic tapes, hard disks and optical data storage devices. The memory unit 122 may further include one or more buffers for temporary storage of data and carrier waves, for example.

The processor unit 126 may be operable to execute instructions stored in the memory unit 122 or elsewhere to carry out processes implemented at the eNB 120, as described in various following embodiments.

The communication interfacing unit 128 is preferably a radio transceiver for wirelessly communicating with other communication devices. The communication interfacing unit 128 may be operable to transform output from the processor unit 126 into radio signals for transmission to the UE 110 and other devices in the network 100, and may be operable to receive radio signals from the UE 110 and other communication devices in the network 100.

Figure 3:
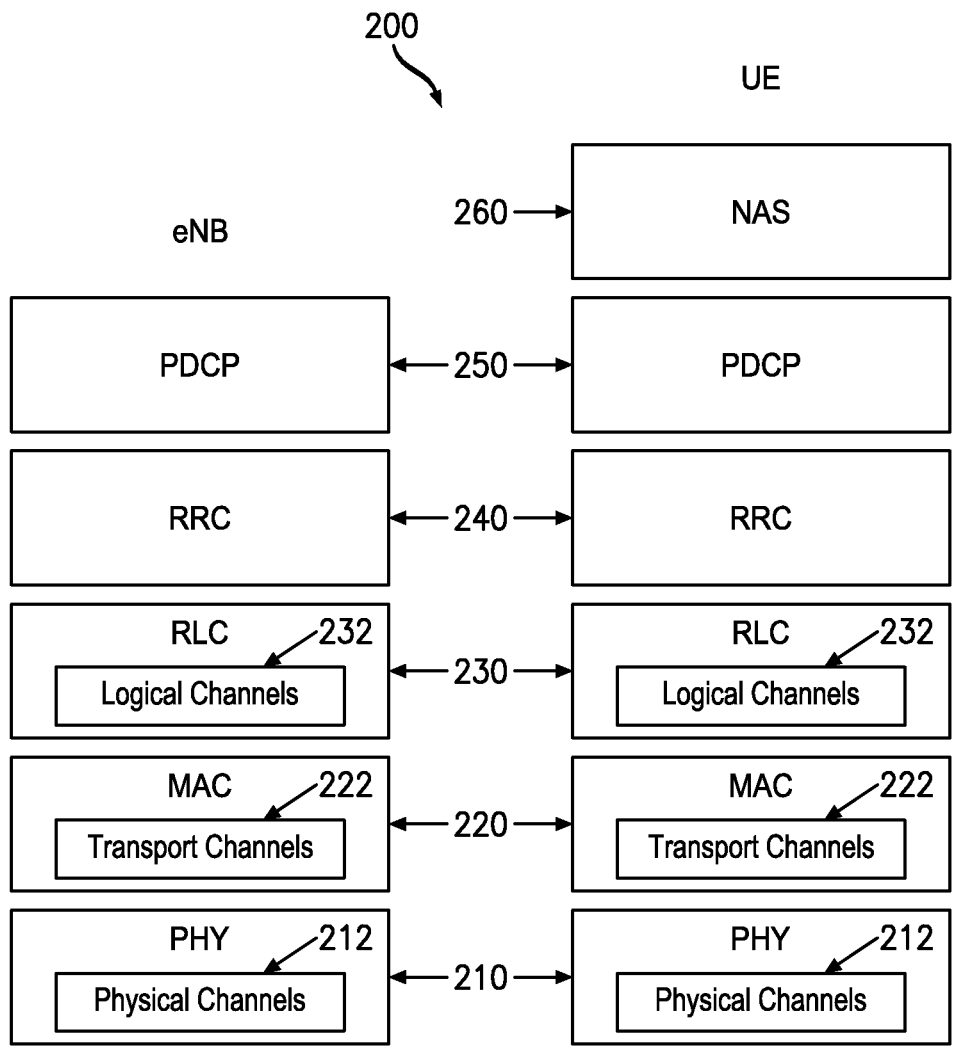
FIG. 3 shows LTE communication protocol stacks for the UE and eNB of FIG. 2.

FIG. 3 shows an exemplary LTE communication channel architecture 200 for the UE 110 and eNB 120. As illustrated in FIG. 3, the architecture 200 includes a physical (PHY) layer 210, a medium access control (MAC) 220, a radio link control (RLC) layer 230, a radio resource control (RRC) layer 240, a physical data convergence protocol (PDCP) layer 250 and a non-access stratum (NAS) layer 260.

Continuing with reference to FIG. 3, the physical layer 210 carries all information from the MAC transport channels 222 over the air interface via physical channels 212 and handles the link adaptation (AMC), power control, cell search for initial synchronization and handover purposes, and other measurements inside the LTE system and between systems) for the RRC layer. The MAC layer 220 is responsible for mapping between logical channels 232 in the RLC layer 230 and transport channels 222, multiplexing of MAC service data units (SDUs) from one or different logical channels 232 onto transport blocks (TBs) to be delivered to the physical layer 210 on the transport channels 222 and de-multiplexing of MAC SDUs from one or different logical channels 232 from TBs delivered from the physical layer on transport channels. The MAC layer 220 is further responsible for scheduling information reporting, error correction through hybrid automatic repeat request (HARQ), priority handling between multiple UEs by means of dynamic scheduling, priority handling between logical channels 232 of the UE 110 and prioritization of logical channels 232.

The RLC layer 230 handles the transfer of upper layer protocol data units (PDUs), error correction through automatic repeat request (ARQ) and concatenation, segmentation and reassembly of RLC SDUs. The RLC layer 230 is also responsible for re-segmentation of RLC data PDUs, reordering of RLC data PDUs, duplicate detection, RLC SDU discard, RLC re-establishment, and protocol error detection.

The RRC layer 240 is responsible for broadcast of system information related to the NAS layer 260 and broadcast of system information related to the access stratum (AS). The RRC layer 240 is further responsible for paging, establishment, maintenance and release of an RRC connection between the UE 110 and eNB 120. Additionally, the RRC layer 240 handles security functions including key management, establishment, configuration, and maintenance and release of point-to-point radio bearers.

The PDCP layer 250 handles header compression and decompression of IP data, transfer of user plane and control plane data, maintenance of PDCP sequence numbers (SNs), in-sequence delivery of upper layer PDUs at re-establishment of lower layers, duplicate elimination of lower layer SDUs at re-establishment of lower layers for radio bearers mapped on RLC acknowledged mode (AM), ciphering and deciphering of user plane data and control plane data, integrity protection and integrity verification of control plane data, timer-based discard and duplicate discarding. PDCP is used for Signal Radio Bearers (SRBs) and Data Radio Bearers (DRBs) mapped on dedicated data channel (DCCH) and dedicated traffic channel (DTCH) types of logical channels.

The NAS layer 260 forms the highest stratum of the control plane between the UE 110 and MME 130. NAS protocols support the mobility of the UE 110 and session management procedures to establish and maintain IP connectivity between the UE and a packet data network gateway (PDN GW).

Logical channels 232 include channels of multiple types. Each logical channel type is defined by the type of information to be transferred. The logical channels 232 are grouped into logical channel groups (LCGs), and the UE reports its uplink buffer status (data awaiting uplink transmission) based on the LCGs. The RRC layer 240 of the UE 110 maps radio bearers to LCGs based on the corresponding quality of service (QoS) attributes of the radio bearers, such as QoS class identifiers (QCIs).

Conventional Buffer Status Reporting

Buffer status reporting procedure is used to provide an eNB with information about the amount of data available for transmission in the uplink buffer in the UE. Per 3GPP TS 36.321, a buffer status report ("BSR") will be triggered under the following conditions:

1) New data arrives in previously empty buffers—Assuming it is the "beginning" of uplink data transmission when all data buffers are empty, if data becomes available for transmission in the UE for any radio bearer, a BSR is triggered.
2) Higher Priority data arrives—If the UE has already sent a BSR and is waiting for an uplink grant, but higher priority data becomes available for transmission, a new BSR is triggered. This occurs even when the triggering radio bearer is in the same LCG for which there is an outstanding BSR.
3) To update the eNB about the current status of buffers—If, for example, the UE is uploading a file, the data is arriving in the UE uplink buffer asynchronously with respect to the uplink grants the UE receives from eNB. Therefore, there is an ongoing need to keep the eNB updated as to the amount of data still to be transmitted. For this purpose, the UE keeps a periodic BSR timer (periodic BSR-timer). When the periodic BSR timer expires, a BSR is triggered. The periodic BSR timer may be disabled by setting it to infinity, which is also the default value.
4) To provide BSR robustness—To avoid deadlock situations which may occur when the UE sends a BSR but never receives an uplink grant from the eNB, a BSR retransmission mechanism is built into the UE implementation. The UE keeps a retransmission BSR timer (retxBSR-timer) which is started when a BSR is sent and stopped when an uplink grant is received. If the timer expires, and the UE has still has data available for transmission, a new BSR is triggered. The retransmission BSR timer, configured by RRC layer, cannot be disabled. The default value for the retransmission timer is 2.56 seconds.
5) uplink resources are allocated and the number of padding bits is equal to or larger than the size of the BSR MAC element (shown below in FIGS. 4A and 4B).

A BSR triggered under conditions 1, 2 and 4 above is known as a "regular BSR." A BSR triggered under condition 3 above is known as a "periodic BSR." A BSR triggered under condition 5 above is known as a "padding BSR."

Figure 4A:
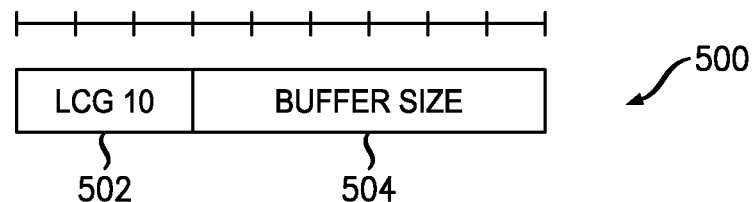
FIG. 4A illustrates an exemplary short buffer status report (BSR) MAC control element.
Figure 4B:
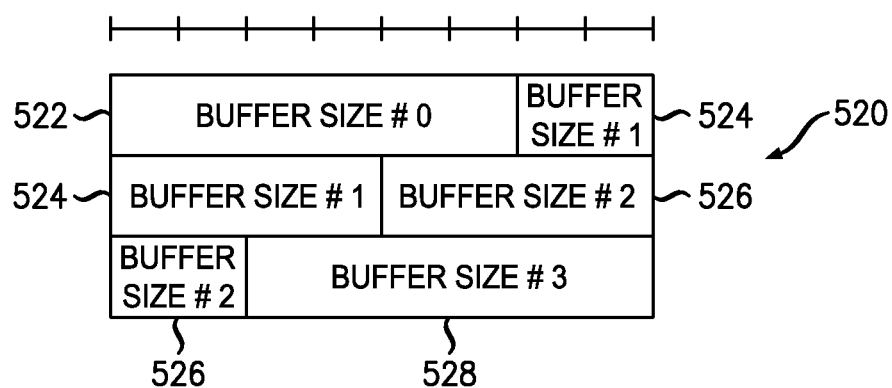
FIG. 4B illustrates an exemplary long BSR MAC control element.

BSRs are transmitted in the form of MAC control elements of two types as illustrated in FIGS. 4A and 4B: a short BSR MAC control element/truncated BSR MAC control element 500 (FIG. 4A); and a long BSR MAC control element 520 (FIG. 4B). As shown in FIG. 4A, the short/truncated BSR MAC control element 500 indicates the buffer size of a single LCG, and includes a LCG ID field 502 identifying the LCG and a buffer size field 504. Referring to FIG. 4B, the long BSR MAC control element 520 indicates the buffer size of multiple LCGs and includes buffer size fields 522, 524, 526, 528 corresponding to LCG IDs (e.g., #0 through #3).

A regular BSR or periodic BSR is reported in the form of a long BSR MAC control element 520 if more than one LCG has data available for transmission in the transmission time interval (TTI) in which the BSR is transmitted; otherwise, a regular BSR or periodic BSR is reported in the form of a short BSR MAC control element 500.

In the case of a padding BSR, if the number of padding bits is equal to or larger than the size of the short BSR plus its subheader (not shown) but smaller than the size of the long BSR plus its subheader (not shown), and more than one LCG has buffered data in the TTI in which the BSR is transmitted, the padding BSR is reported in the form of a truncated BSR MAC control element 500 of the LCG with the highest priority logical channel with data available for transmission. If the number of padding bits is equal to or larger than the size of the short BSR plus its subheader (not shown) but smaller than the size of the long BSR plus its subheader, and not more than one LCG has buffered data in the TTI in which the BSR is transmitted, the padding BSR is reported in the form of a short BSR MAC control element 500. Otherwise, if the number of padding bits is equal to or larger than the size of the long BSR plus its subheader, the padding BSR is reported in the form of a long BSR MAC control element 520.

If the UE 110 has uplink resources allocated for a new transmission for the TTI and the buffer status reporting procedure determines that 1) at least one BSR has been triggered since the last transmission of a BSR, or 2) it is the first time that at least one BSR is triggered, then: a MAC BSR control element 500, 520 is generated; the periodic BSR timer is started or restarted (except when the BSR MAC control element is a truncated BSR MAC control element 500); and the retransmission BSR timer is started (if not running) or restarted (if running). If the UE 110 does not have uplink resources allocated for a new transmission for the TTI and the buffer status reporting procedure determines that 1) at least one BSR has been triggered since the last transmission of a BSR, or 2) it is the first time that at least one BSR is triggered, then a scheduling request (SR) is triggered.

A MAC PDU will contain at most one MAC BSR control element 500, 520. When multiple events trigger a BSR by the time a BSR can be transmitted, a regular BSR and a periodic BSR will have precedence over a padding BSR.

The UE will restart (if running) the retransmission BSR timer upon reception of a grant for transmission of new data from the eNB.

All triggered BSRs will be cancelled when an uplink grant can accommodate all pending data available for transmission but cannot additionally accommodate the BSR MAC control element. Furthermore, all triggered BSRs will be cancelled when a BSR is included in a MAC PDU for transmission.

The following paragraphs disclose embodiments including improved features and functions of the UE 110 and eNB 120 that provide enhanced DRX performance.

UE Features

As indicated in the disclosure above, BSR-related problems such as lost, late or delayed BSRs may result in a DRX mismatch between a UE and an eNB in the conventional 3GPP TS 36.321 DRX solution. Therefore, according to at least one embodiment, improvements are implemented at the UE 110 to reduce the likelihood of DRX mismatches between the UE 110 and the eNB 120. As described below in detail, DRX performance may be improved by providing the UE 110 with one or more of the following: a novel implementation of a retransmission BSR timer (retxBSR-timer); a configurable "data flush token" and process for using the data flush token to expedite retransmission of BSRs; and a novel approach to canceling regular BSRs.

As stated above, according to one embodiment, the UE 110 includes a novel implementation of a retransmission BSR timer. In the UE 110, the retransmission BSR timer may be a logical channel attribute that is independently configurable for each logical channel in the communication protocol stack of the UE 110. Accordingly, a variable time delay for retransmitting a regular BSR based on non-receipt of an uplink grant from the eNB 120 can be set for each logical channel in the communication protocol stack of the UE 110 by configuring the retransmission BSR timer for each logical channel. Regular BSRs may therefore be triggered by the UE 110 based on the delay requirements of a particular application running on the UE. As indicated by the logical channel configuration field description table 700 of FIG. 5, the BSR transmission timer parameter may be included in the LogicalChannelConfig information element (generated by the RRC layer 240) for each logical channel 232 of the UE 110. This is contrary to conventional LTE communications specified by 3GPP TS 36.321, in which the retransmission BSR timer is an attribute of the UE applied uniformly at the RRC layer to all logical channels of the UE.

According to a preferred embodiment the time delay of the retransmission BSR timer for each logical channel may be set at a value between 10 milliseconds and 1 second. However, other time delay values are possible.

According to another embodiment, a data flush token is provided as a logical channel attribute and may be utilized to expedite emptying of the uplink buffer of the UE 110 by generating an additional BSR (referred to herein as an "irregular, regular BSR") prior to expiration of the Retransmission BSR timer, so that the UE 110 may go into a sleep state (DRX OFF) as early as possible without causing a high amount of interference with the uplink system. The data flush token may be a parameter having an integer value that specifies the maximum allowed number of requests for triggering an irregular, regular BSR. An irregular, regular BSR is similar to a regular BSR, but is triggered to speed up the process of uplink bandwidth granting when the UE 110 has data in its uplink buffer for transmission and there is no pending regular BSR (i.e., a regular BSR that has been generated and has not been canceled).

An initial, configured value of the data flush token may be set at the UE 110 in the LogicalChannelConfig information element, as indicated by FIG. 5. According to one embodiment, the initial, configured value of the data flush token depends on the priority assigned to the logical channel—logical channels that are assigned higher priorities will preferably have data flush tokens of higher initial values. According to some embodiments, the initial configured value of the data flush token may be between 0 and 10. However, other values are possible.

According to an embodiment, the UE 110 generates an irregular, regular BSR if the data flush token has a value greater than 0, there is an outstanding periodic BSR, the UE 110 has data in its uplink buffer for transmission and there is no pending regular BSR. Once an irregular, regular BSR is triggered, the value of the data flush token is decremented by 1. Subsequent irregular, regular BSRs may be triggered if the data flush token has a value greater than 0 after being decremented, data remains in the uplink buffer for transmission, and there is no pending regular BSR. If the data flush token is exhausted (i.e., is decremented to a value of 0), no further irregular, regular BSRs will be triggered until the data flush token value is reset to its initial, configured value. The data flush token value is reset to the initial, configured value whenever the retransmission BSR timer is started or restarted. The data flush token may be disabled by setting the initial, configured value to 0.

Figure 6:
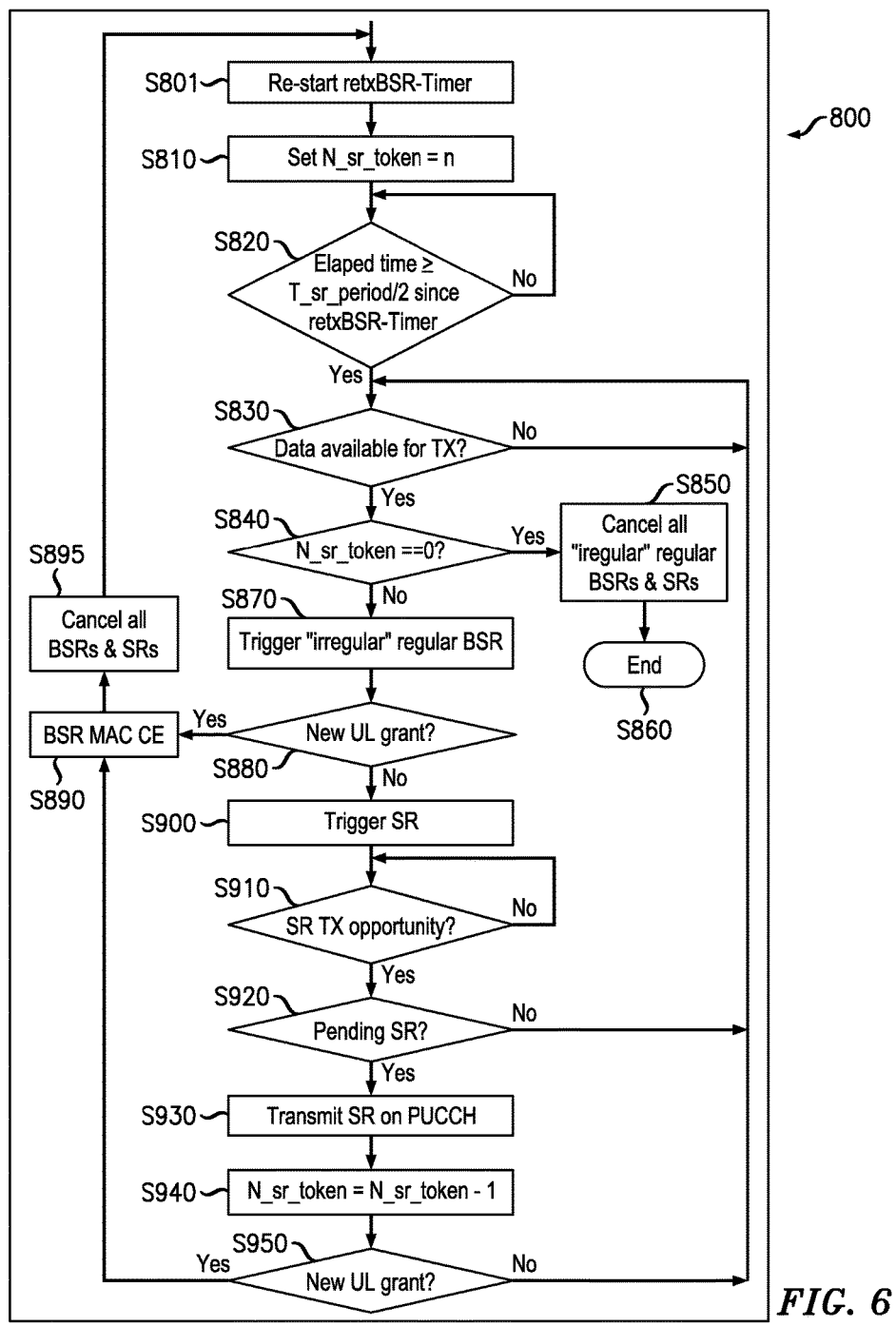
FIG. 6 illustrates a method of using a data flush token to speed up retransmission of a BSR by the user equipment of FIG. 2, according to an embodiment of the invention.

FIG. 6 illustrates an exemplary MAC layer process 800 implemented by the UE 110 for using a data flush token to expedite retransmission of a BSR, and thereby promote faster emptying of the uplink buffer. As shown in FIG. 6, in step S801, the retransmission BSR timer is started or restarted. In step S810, the data flush token (N_sr_token) is set to an initial integer value (e.g., "2"). In step S820, it is determined whether the elapsed time since the start of the retransmission BSR timer is greater than or equal to one half of the scheduling request period (T_sr_period). If, in step S820, the elapsed time since the start of the retransmission BSR timer is greater than or equal to one half of the scheduling request period, it is then determined in step S830 whether there is data available in the uplink buffer for transmission. If, in step S820, the elapsed time since the start of the retransmission BSR timer is not greater than or equal to one half of the scheduling request period, step S820 is repeated within one transmission time interval (TTI). If it is determined in step S830 that there is no data in the uplink buffer for transmission, step S830 is repeated in one TTI. However, if it is determined in step S830 that there is data in the uplink buffer for transmission, the process 800 advances to step S840.

Continuing, in step S840 it is determined whether the value of the data flush token is 0. If the value of the data flush token is 0, then all irregular, regular BSRs and any scheduling requests (SRs) are canceled in step S850 and, in step S860, the use of the data flush token ends and a normal (conventional) BSR management procedure is entered. Otherwise, if the value of the data flush token is determined to be a value other than 0 in step S840, the process 800 advances to step S870 at which an irregular, regular BSR is triggered.

After the irregular, regular BSR is triggered in step S870, the UE 110 determines in step S880 whether any new uplink grant is received in the current TTI. If a new uplink grant is received, a BSR MAC control element (CE) is prepared in step S890, all BSRs and SRs are thereby canceled in step S895 and the process returns to step S801. If a new uplink grant is not received, then an SR is triggered in step S900.

In step S910, it is determined whether the current TTI is an SR transmission opportunity. If it is determined that the current TTI is an SR transmission opportunity, the process 800 continues to step S920. Otherwise, step S910 is repeated in one TTI.

Continuing, it is determined in step S920 whether there is any pending SR. If there is a pending SR, the process 800 proceeds to step S930. Otherwise, the process returns to step S830.

In step S930, a SR is transmitted on the physical uplink control channel (PUCCH). The data flush token is then decremented by 1 in step S940.

Next, in step S950 it is determined whether a new uplink grant is received. If a new uplink grant is received, a MAC BSR CE is prepared in step S890, all BSRs and SRs are thereby canceled in step S895 and the process 800 returns to step S801. Otherwise, the process returns to step S830.

The process 800 described above with respect to FIG. 6 is merely one example of a process for using a data flush token to expedite emptying of the uplink buffer of the UE 110. It should be understood that variations of this process are within the scope of the invention.

According to a further embodiment, the UE 110 is configured to cancel a regular BSR only if it receives a positive acknowledgement (HARQ ACK) on the downlink to the uplink transmission carrying the regular BSR. It is noted that, according to this embodiment, if higher priority data becomes available after transmission of the regular BSR and prior to receipt of the HARQ ACK, a subsequent, new regular BSR triggered by the higher priority data will not be canceled by the HARQ ACK. This novel solution is contrary to the conventional solution under TS 36.321, in which, after being transmitted, a regular BSR will be canceled if higher priority data becomes available, regardless of whether the regular BSR actually reaches the eNB. In the conventional solution, if the uplink transmission carrying the regular BSR fails, the regular BSR will not reach the eNB and the UE may not be scheduled for uplink transmission until it sends an SR—and an SR is triggered only when a regular BSR has been triggered.

The solutions described above mitigate the problem of a UE entering the DRX OFF (inactive) state while it still has data in the uplink buffer.

eNB Features

According to one or more embodiments, novel solutions may be implemented at the eNB 120 in compliance with TS 36.321 to improve DRX performance. More specifically, as will be described below in detail, the eNB 120 may be provided with enhancements to its downlink scheduler (DLS) and uplink scheduler (ULS), and may be configured for improved handling of late BSRs and delayed BSRs.

Enhancements to the Scheduler

As is appreciated by those of ordinary skill in the art, the main task of a DLS and ULS at the MAC layer is the mapping of logical channels to appropriate transport channels in accordance with requirements of services provided to the UE 110. As is the case with conventional wireless networks, quality of service (QoS) defines priorities of certain services to the UE 110 and is applied on a per bearer basis. A QoS Class Identifier (QCI), which is a scalar denoting a set of transport characteristics (e.g., bearer with/without guaranteed bit rate, priority, packet delay budget, packet error loss rate), is used to infer specific parameters that control packet forwarding treatment of the UE 110. Such parameters include QoS scheduling weights, admission thresholds, queue management thresholds and link-layer protocol configuration, to name a few.

The inventors appreciate that, while DRX control is mainly regulated by uplink traffic, in the absence of uplink traffic, downlink traffic may be shaped by the DLS according to the DRX configuration in order to improve downlink data performance and battery power saving in the UE 110. In order to provide a good trade-off between downlink data performance and battery power saving, it is desirable to flush out downlink data for the UE 110 accumulated in the eNB 120 over an entire DRX cycle within the DRX ON period of the cycle. Therefore, according to one embodiment, the DLS of the eNB 120 may give the UE 110 a higher service priority, in comparison to its ordinary service priority, if the current TTI lies within the UE's DRX ON period. More specifically, the DLS may apply QoS boost factors (e.g., multipliers) to the QoS scheduling weights for the downlink radio bearers of the UE 110. If the current TTI lies within the UE's current DRX ON period, the ULS may individually set the QoS boost factors for the downlink radio bearers to values greater than 1. More particularly, the value assigned to each QoS boost factor may be different. The QoS boost factors thereby increase the QoS scheduling weights of the downlink radio bearers and the downlink logical channels of the UE 110, so that it is more likely that the DLS will serve the UE 110 in the current DRX ON period, instead of delaying service to the UE 110 until the next DRX ON period. The value assigned to the QoS boost factor for each data radio bearer during the DRX ON period is preferably based on the QCI for the data radio bearer. Preferably, the values assigned to the QoS boost factors for signaling radio bearers during the DRX ON period should be greater than the values assigned to the QoS boost factors for data radio bearers.

Once the DRX ON period ends, the service priority of the UE 110 may be reduced to its ordinary level by the DLS decreasing each QoS boost factor to a value of 1, thereby disabling the QoS boost factors.

To conserve battery power, it is also desirable that the UE 110 be able to empty its uplink buffer as soon as possible and enter the DRX OFF state. Therefore, according to another embodiment, the ULS of the eNB 120 may give the UE 110 a higher service priority, in comparison to its ordinary service priority, if the UE's next uplink transmission opportunity lies within the UE's current DRX ON period. More specifically, the ULS may apply QoS boost factors (e.g., multipliers) to the QoS scheduling weights for the uplink radio bearers of the UE 110. If the UE's next uplink transmission opportunity lies within the UE's DRX ON period, the ULS may individually set the QoS boost factors for the uplink radio bearers to values greater than 1. To be more specific, the value assigned to each QoS boost factor may be different. The QoS boost factors thereby increase the QoS scheduling weights of the uplink radio bearers and the uplink logical channels of the UE 110, so that it is more likely that the ULS will serve the UE 110 in the current DRX ON period, rather than delay service until the next DRX ON period. The value assigned to the QoS boost factor for each data radio bearer during the DRX ON period is preferably based on the QoS control indicator (QCI) for the downlink radio bearer. Preferably, the values assigned to the QoS boost factors for signaling radio bearers during the DRX ON period should be greater than the values assigned to the QoS boost factors for data radio bearers. Accordingly, the ULS expedites uplink resource granting for the UE 110 and the UE 110 will have more opportunities to empty its uplink buffer and enter the DRX OFF state as soon as possible.

Once the DRX ON period ends, the service priority of the UE 110 may be reduced to its ordinary level by the ULS decreasing each QoS boost factor to a value of 1, thereby disabling the QoS boost factors.

Detection and Handling of Late BSRs

According to another embodiment, an improved method of detecting and handling a "late" BSR is provided. For purposes of this disclosure, a late BSR is a BSR that, as determined by the eNB 120, is received by the eNB 120 when the UE 110 is in the DRX OFF state, and the BSR is the last one that the UE 110 transmitted. With respect to the disclosed method of handling a late BSR, it is important to note that BSRs may be received out of order due to HARQ, and it is desirable to reorder BSRs for better DRX performance.

According to one embodiment, when the eNB 120 receives a late BSR, the eNB 120 deems the information exchange (UE) to be dormant at the UE side. The ULS of the eNB 120 will hold the late BSR until the next DRX ON opportunity. The eNB 120 will then determine whether the late BSR or part of the late BSR is expired (received too late) or effective (received in good enough time) based on the time at which the late BSR was generated and the network's requirement on higher-layer packet delay (e.g., PDCP discard timer). If the late BSR/part of the late BSR is determined to be expired, the expired late BSR/expired part of the late BSR is discarded. If the late BSR/part of the late BSR is determined to be effective, the effective late BSR/effective part of the late BSR is used to update the uplink buffer occupancy (BO) of the eNB 120 and the ULS will grant the UE 110 uplink bandwidth resource as soon as possible. More specifically, once the UE 110 enters the DRX ON period, the ULS may individually apply QoS boost factors of values greater than 1 to the QoS scheduling weights for each uplink radio bearer. The QoS boost factors may be applied according to the principles set forth above with respect to uplink scheduling. This reduces the scheduling delay for granting of the uplink bandwidth resource.

Figure 7:
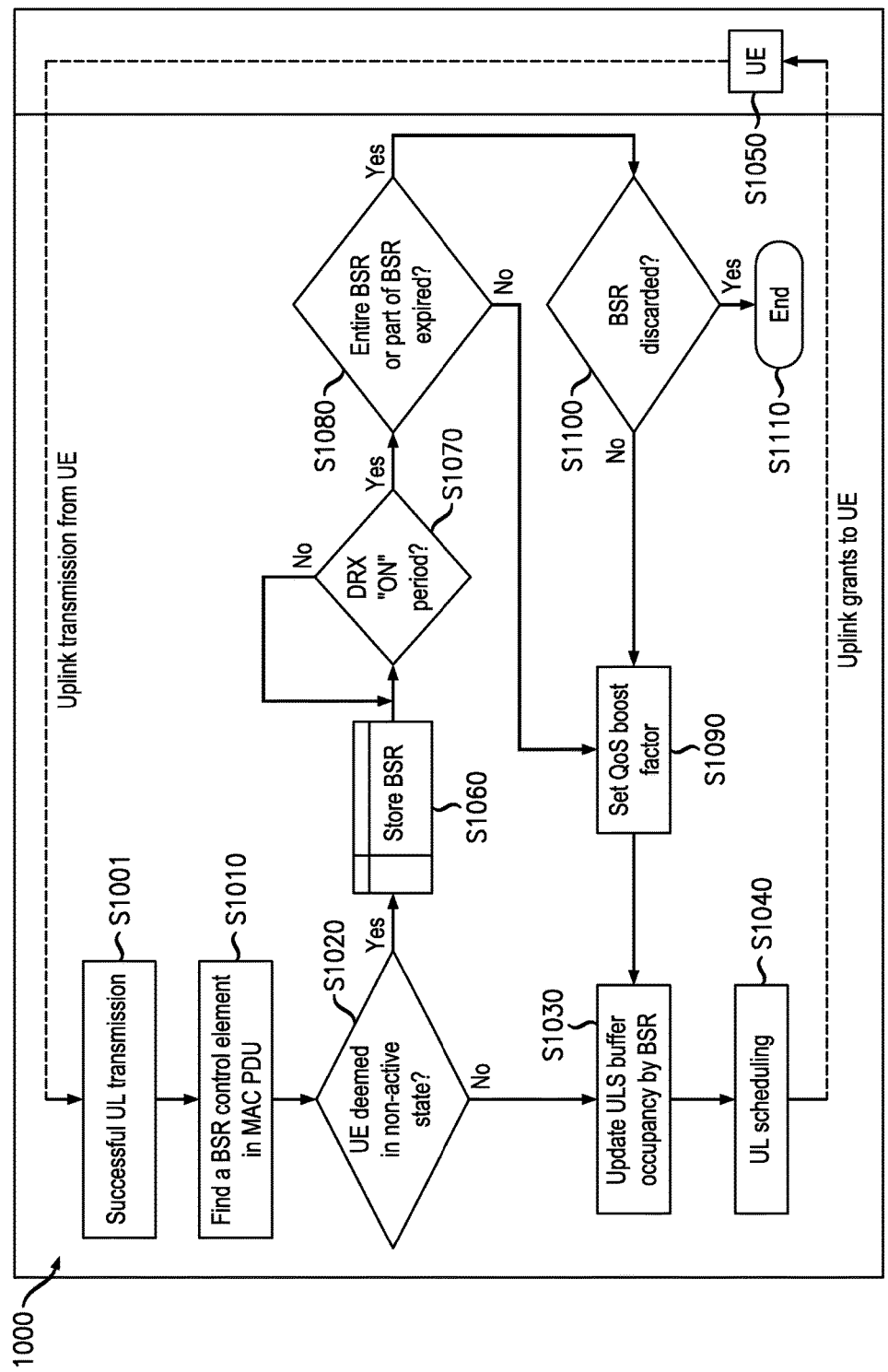
FIG. 7 illustrates a method of detecting and handling a late BSR at the base station of FIG. 2, according to an embodiment of the invention.

FIG. 7 illustrates an exemplary method 1000 for detecting and handling a late BSR, according to an embodiment of the invention. As shown in FIG. 7, the eNB 120 receives an uplink transmission in step S1001 and finds a BSR in step S1010 (steps S1001 and S1010 may collectively be considered as receiving a BSR). Upon receiving the BSR, the eNB 120 determines whether the UE 110 is in the DRX OFF state in step S1020.

If the eNB 120 determines that the UE 110 is not in the DRX OFF state, then the eNB 120 updates its uplink ULS buffer occupancy by the BSR in step S1030 and grants the UE 110 uplink bandwidth resource in step S1040. Thereafter, in UE 110 may make an uplink transmission in step S1050.

If, in step S1020, the eNB 120 determines that the UE 110 is in the DRX OFF state, then the eNB 120 determines that the BSR is a late BSR and stores the BSR in its uplink buffer in step S1060. Thereafter, in step S1070, the eNB 120 checks with its DRX management entity to determine whether the UE 110 is in or is entering the DRX ON period. If it is determined that the UE 110 is in or is entering the DRX ON period and the BSR is stored in the eNB's uplink buffer, then, in step S1080, the eNB 120 determines whether the entire BSR or part of the BSR is expired based on the time at which the BSR was transmitted and the PDCP discard timer configured by the higher layer.

If the entire BSR is determined not to be expired (i.e., the entire BSR is effective) in step S1080, then, in step S1090, the ULS individually applies QoS boost factors of a value greater than 1 to the QoS scheduling weights for the uplink radio bearers. The QoS boost factors may be applied according to the principles set forth above with respect to uplink scheduling. The UE 110 is then eligible for uplink transmission scheduling in the DRX ON period. Thereafter, the process 1000 proceeds to steps S1030-S1050, which are described above.

If the entire BSR is determined to be expired in step S1080, then the entire BSR is discarded in step S1100, the UE's uplink buffer occupancy is decreased by the BSR and the process 1000 is ended for the entire BSR in step S1110.

If only part of the BSR is determined to be expired in step S1080, the expired part of the BSR is discarded in step S1100, the UE's uplink buffer occupancy is decreased by the expired part of the BSR, and the process 1000 is ended for the expired part of the BSR in step S1100. In step S1090, the ULS individually applies QoS boost factors of a value greater than 1 to the QoS scheduling weights for the uplink radio bearers. The QoS boost factors may be applied according to the principles set forth above with respect to uplink scheduling. The UE 110 is then eligible for uplink transmission scheduling in the DRX ON period. Thereafter, the process 1000 proceeds to steps S1030-S1050, which are described above.

The process 1000 described above with respect to FIG. 7 is merely one example of a process for using detecting and handling a late BSR. It should be understood that variations of this process are within the scope of the invention.

Detection and Handling of Delayed BSRs

According to another embodiment, an improved method of detecting and handling a "delayed" BSR is provided. For purposes of this disclosure, a delayed BSR is a BSR that, as determined by the eNB 120, is received during the UE's DRX ON period and deemed to be active, but the amount of data requested by the BSR is not served until the UE 110 is deemed by the eNB 120 to have entered the DRX OFF state and has become inactive/dormant due to a long scheduling delay from competition among multiple UEs in the network 100. The eNB 120 will hold a delayed BSR in its uplink buffer until the next DRX ON period of the UE 110.

While holding a delayed BSR, the eNB 120 will determine whether the delayed BSR or part of the delayed BSR is expired (received too late) or effective (received in good enough time) based on the time at which the delayed BSR was generated and the network's requirement on higher-layer packet delay (e.g., PDCP discard timer). If the delayed BSR/part of the delayed BSR is deemed to be expired, the expired BSR/part of the delayed BSR is discarded. If the delayed BSR/part of the delayed BSR is deemed to be effective, then the UE 110 is granted uplink bandwidth resource as soon as possible. More specifically, once the UE 110 enters the DRX ON period, the ULS may individually apply QoS boost factors of values greater than 1 to the QoS scheduling weights for the uplink radio bearers. Again, the QoS boost factors may be applied according to the principles set forth above with respect to uplink scheduling. This will help improve data performance by giving the UE 110 a greater likelihood of being served as early as possible.

Figure 8:
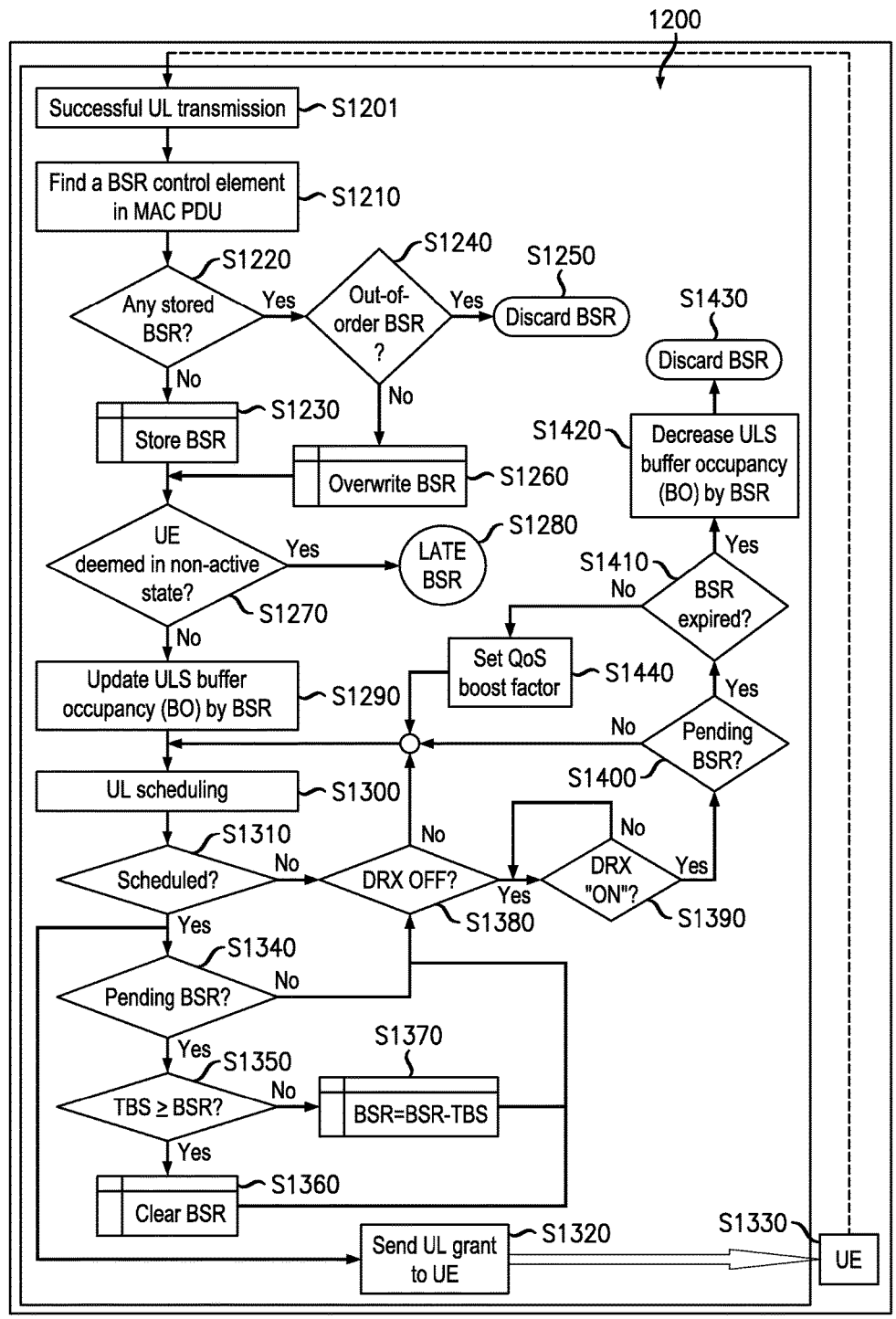
FIG. 8 illustrates a method of detecting and handling a delayed BSR at the base station of FIG. 2, according to an embodiment of the invention.

FIG. 8 illustrates an exemplary method 1200 for detecting and handling a delayed BSR, according to an embodiment of the invention. As shown in FIG. 8, the eNB 120 receives an uplink transmission in step S1201 and finds a current BSR in step S1210 (steps S1201 and S1210 may collectively be considered as receiving a current BSR). The time at which the current BSR was transmitted is denoted as $t_n$. Upon receiving the current BSR, the eNB 120 determines at step S1220 whether a previous BSR is still pending in the eNB's uplink buffer. If there is no pending previous BSR, the current BSR is stored in the eNB's uplink buffer in step S1230. If it is determined at step S1220 that there is a previous BSR pending in the eNB's uplink buffer, then the time at which the previous BSR was transmitted is denoted as $t_{n-1}$ and the eNB 120 determines, at step S1240, whether the current BSR is out-of-order. The current BSR is determined to be out of order if the current BSR was transmitted before the previous BSR (i.e., $t_n < t_{n-1}$). If the current BSR is determined to be out-of-order, then it is discarded in step S1250. Otherwise, the previous BSR is overwritten by the current BSR in step S1260. The process 1200 continues to step S1270 from either step S1230 or step S1260.

At step S1270, the eNB 120 checks its DRX management to determine whether the UE 110 is in the DRX OFF state. If the UE 110 is determined to be in the DRX OFF state, then the current BSR is determined to be a late BSR in step 1280 and the current BSR is handled in the same manner that a late BSR is handled in the previously described process 1000, which is illustrated in FIG. 7. If the UE 110 is determined to not be in the DRX OFF state, then the UE's uplink buffer occupancy (BO) is updated by the current BSR in step S1290 and typical uplink scheduling is carried out in step S1300.

Next, at step S1310, the eNB 120 determines whether the UE 110 is successfully scheduled for uplink transmission. If the UE 110 is successfully scheduled for uplink transmission, then the eNB 120 sends an uplink grant to the UE 110 in step S1320 and the UE 110 then sends an uplink transmission in step S1330. Additionally, if the UE 110 is successfully scheduled for uplink transmission the eNB 120 determines, in step S1340, whether any BSR is pending in the eNB's uplink buffer. If it is determined that a BSR is pending in step S1340, then the eNB 120 determines at step S1350 whether the transport block size (TBS) of the scheduled uplink transmission associated with the current BSR is greater than or equal to the amount of data space requested by the pending BSR (TBS≥BSR). If the TBS of the scheduled uplink transmission is greater than or equal to the amount of data space requested by the pending BSR, then the eNB 120 clears the pending BSR in step S1360. If the TBS of the scheduled uplink transmission is less than the amount of data space requested by the pending BSR, then, in step S1370, the eNB 120 decrements the pending BSR by the TBS (BSR=BSR−TBS). Upon completion of step S1360 or step S1370, the process 1200 continues to step 1380.

Backtracking, if the eNB 120 determines at step S1310 that the UE 110 is not successfully scheduled for uplink transmission, then the process 1200 proceeds to step 1380. Additionally, if the eNB 120 determines, in step S1340, that no BSR is pending, the process 1200 will continue to step S1380.

Continuing, in step S1380, the eNB 120 checks its DRX management to determine whether the UE 110 is in the DRX OFF state. If the UE 110 is determined to not be in the DRX OFF state, then the process 1200 continues back to step S1300, as the UE 110 continues to be eligible for uplink scheduling. If the eNB 120 determines in step S1380 that the UE 110 is in the DRX OFF state, then the eNB 120 checks its DRX management again in step S1390 to determine whether the UE 110 is in the DRX ON state or is entering the DRX ON state. If the eNB 120 determines that the UE 110 is not in or entering the DRX ON, then step S1390 is repeated. If it is determined that the UE 110 is in or entering the DRX ON state, then the eNB 120 determines in step S1400 whether there is a pending BSR in the eNB's uplink buffer. If there is no pending BSR, then the process 1200 goes back to step S1300. If there is a pending BSR, the process 1200 advances to step S1410.

In step S1410, the eNB 120 determines whether the entire pending BSR or part of the pending BSR is expired based on the time at which the pending BSR was transmitted and the PDCP discard timer configured by the higher layer.

If the entire pending BSR is determined to be expired in step S1410, then the UE's uplink buffer occupancy (BO) is decreased by the pending BSR in step S1420 and the entire pending BSR is discarded in step S1430.

If the entire BSR is determined not to be expired (i.e., the entire BSR is effective) in step S1410, then, in step S1440, the ULS individually applies QoS boost factors of values greater than 1 to the QoS scheduling weights for the uplink radio bearers. The QoS boost factors may be applied according to the principles set forth above with respect to uplink scheduling. Thereafter, the process 1200 returns to step S1300.

If only part of the pending BSR is determined to be expired in step S1410, the UE's uplink buffer occupancy is decreased by the expired part of the pending BSR in step S1420, and the expired part of the pending BSR is discarded in step S11430; in step S1440 the ULS individually applies QoS boost factors of values greater than 1 to the QoS scheduling weights for the uplink radio bearers. Again, the QoS boost factors may be applied according to the principles set forth above with respect to uplink scheduling. Thereafter, the process 1200 returns to step S1300.

The process 1200 described above with respect to FIG. 8 is merely one example of a process for using detecting and handling a delayed BSR. It should be understood that variations of this process are within the scope of the invention.

The novel methods, features, devices and systems disclosed herein provide improved DRX management in wireless telecommunication networks. Through the improved DRX management provided herein, greater conservation of UE battery power and improved data performance are achieved.

It should be understood that a network may include one of the disclosed embodiments or two or more of the disclosed embodiments implemented in combination.

It should be understood that the methods, features, devices and systems disclosed herein are merely exemplary embodiments of the invention. One of ordinary skill in the art will appreciate that changes and variations to the disclosed embodiments may be made without departing from the spirit and scope of the inventions as set forth in the appended claims.

What is claimed is:

1. A method for conserving power of a user device in a telecommunication network, the method comprising:
    setting a data flush token to a value depending on a priority assigned to a logical channel, the value indicating a number of requests permitted for triggering an irregular, regular buffer status report;
    determining that the user device has data in an uplink buffer for transmission on the logical channel and that a regular buffer status report previously generated by the user device for the logical channel is not pending; and based on the determination, and that a current value of the data flush token is greater than a reference value, triggering an irregular, regular buffer status report.

2. The method of claim 1, comprising: repeating said determining step.

3. The method of claim 1, comprising resetting the value of the data flush token to an initial value based on a determination that a retransmission buffer status report timer is started or restarted by the user device.

4. The method of claim 1, wherein the communication protocol stack is a long-term evolution communication protocol stack.

5. The method of claim 1, further comprising:
triggering a regular buffer status report indicating an amount of data available for transmission in the uplink buffer of the user device; and
canceling the regular buffer status report after determining that the user device receives a positive acknowledgement on a downlink to an uplink transmission carrying the regular buffer status report.

6. The method of claim 5 further comprising,
setting a plurality of retransmission buffer status report timers for a corresponding plurality of logical channels in a communication protocol stack of the user device, the plurality of retransmission buffer status report timers independently configurable and indicating a time delay for retransmission of a buffer status report by the user device on a respective one of the plurality of logical channels.

7. A user device for a telecommunication network, comprising:
a processor configured to execute instructions stored in a memory to:
a) set a data flush token to a value depending on a priority assigned to a logical channel, the value indicating a number of requests permitted for triggering an irregular, regular buffer status report; and
b) determine that the user device has data in an uplink buffer for transmission on the logical channel and that a regular buffer status report previously generated by the user device for the logical channel is not pending; and
c) based on the determination, and that a current value of the data flush token is greater than a reference value, trigger an irregular, regular buffer status report.

8. The user device of claim 7, wherein the user device is operable to d) repeat step c).

9. The user device of claim 7 further operable to reset the data flush token to an initial value based upon a determination that a retransmission buffer status report timer is started or restarted by the user device.

10. The user device of claim 7, wherein the communication protocol stack is a long-term evolution communication protocol stack.

11. The user device of claim 7 further operable to:
generate an independently configurable retransmission buffer status report timer for each logical channel in the communication protocol stack of the user device, and
configure the retransmission buffer status report timer to set a time delay for retransmission of a buffer status report by the user device,
insert the retransmission buffer status report timer in a LogicalChannelConfig information element generated by a radio resource control layer of the communication protocol stack,
wherein the buffer status report indicates an amount of data available for transmission in the uplink buffer of the user device.

12. The user device as in claim 11 further operable to insert the retransmission buffer status report timer in a LogicalChannelConfig information element generated by a radio resource control layer of the communication protocol stack.

13. The user device as in claim 7 further operable to:
trigger a regular buffer status report indicating an amount of data available for transmission in the uplink buffer of the user device; and
cancel the regular buffer status report after determining that the user device receives a positive acknowledgement on a downlink to an uplink transmission carrying the regular buffer status report.

* * * * *